(No Model.)

J. BOWERS.
DRAFT EQUALIZER.

No. 291,976. Patented Jan. 15, 1884.

WITNESSES:
Theo. G. Hoster
C. Sedgwick

INVENTOR:
J. Bowers
BY
ATTORNEYS.

UNITED STATES PATENT OFFICE.

JOHN BOWERS, OF BROOKVILLE, ILLINOIS.

DRAFT-EQUALIZER.

SPECIFICATION forming part of Letters Patent No. 291,976, dated January 15, 1884.

Application filed October 27, 1883. (No model.)

*To all whom it may concern:*

Be it known that I, JOHN BOWERS, of Brookville, in the county of Ogle and State of Illinois, have invented a new and Improved Draft-Equalizer, of which the following is a full, clear, and exact description.

The object of my invention is to provide a new and improved draft-equalizer for three horses, which is so constructed that the draft will be direct, and each horse will exert a like draft.

The invention consists in the combination, with a tongue, of two arms projecting from the same, double-trees pivoted to the said arms, and two single-trees held on the ends of one double-tree, and one single-tree being held on the outer end of the other double-tree, the latter double-tree having its inner end connected by links or loops with the middle of the other or first double-tree.

Reference is to be had to the accompanying drawings, forming a part of this specification, in which similar letters of reference indicate corresponding parts in both figures.

Figure 1:
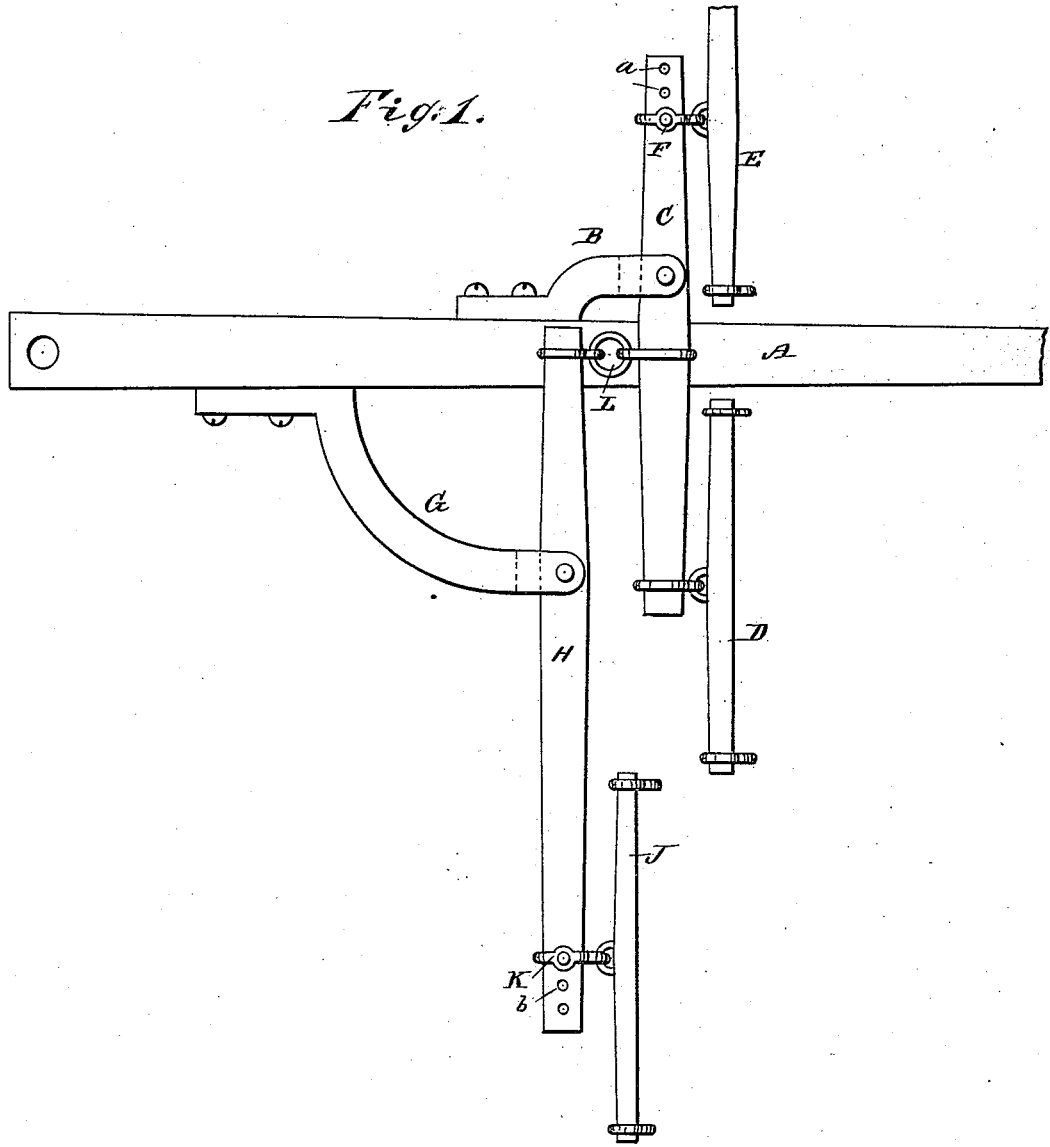
Figure 2:
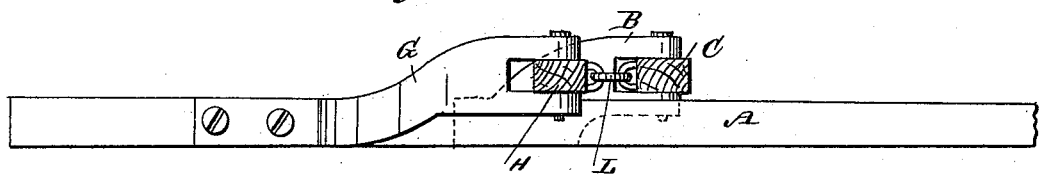

Figure 1 is a plan view of my improved draft-equalizer. Fig. 2 is a side view of the same, the double-trees being shown in section.

To one side of the tongue A a short arm, B, is fastened, which extends in a direction parallel with the tongue A, and to the free end of the said arm a double-tree, C, is pivoted, to one end of which a single-tree, D, is held permanently, and to the opposite end a single-tree, E, is held adjustably by a pin, F, which is passed through a clip or loop of the single-tree, and through one of a series of apertures, *a*, in the end of the double-tree C. The double-tree C is pivoted about two-fifths of its length from the outer end.

To that side of the tongue A opposite the one to which the arm B is secured an arm, G, is fastened, which projects outward and toward the front, to the free end of which arm a double-tree, H, is pivoted, on the outer end of which a single-tree, J, is held by a pin, K, passed through a clip or loop of the single-tree, and one of a series of apertures, *b*, on the outer end of double-tree H. The inner end of the double-tree H is connected by loops L with the middle of the double-tree C, the loops L being a short distance toward the tongue from the arm B. The double-tree H is pivoted about one-third of its length from its inner end. The draft will thus be direct.

The middle horse has a two-thirds leverage over the horse on the other side of the tongue, and has a compound leverage over the outside horse on the same side of the tongue.

Having thus described my invention, I claim as new and desire to secure by Letters Patent—

1. In a three-horse equalizer, the combination, with the tongue A, of the double-trees C H, fulcrumed at opposite sides of the tongue, and connected in line therewith, as shown and described.

2. The combination, with the tongue A and the arms B and G, of the double-trees C and H, pivoted to the arms B and G, respectively, the single-tree D, held on the inner end of the double-tree C, the single-tree E, held adjustably on the outer end of the double-tree C, the single-tree J, held adjustably on the outer end of the double-tree H, and the links or loops L, connecting the inner end of the double-tree H with the middle of the double-tree C, substantially as herein shown and described.

JOHN BOWERS.

Witnesses:
   A. J. MCCREA,
   WILLIAM F. WEAVER.